United States Patent Office 2,805,107
Patented Sept. 3, 1957

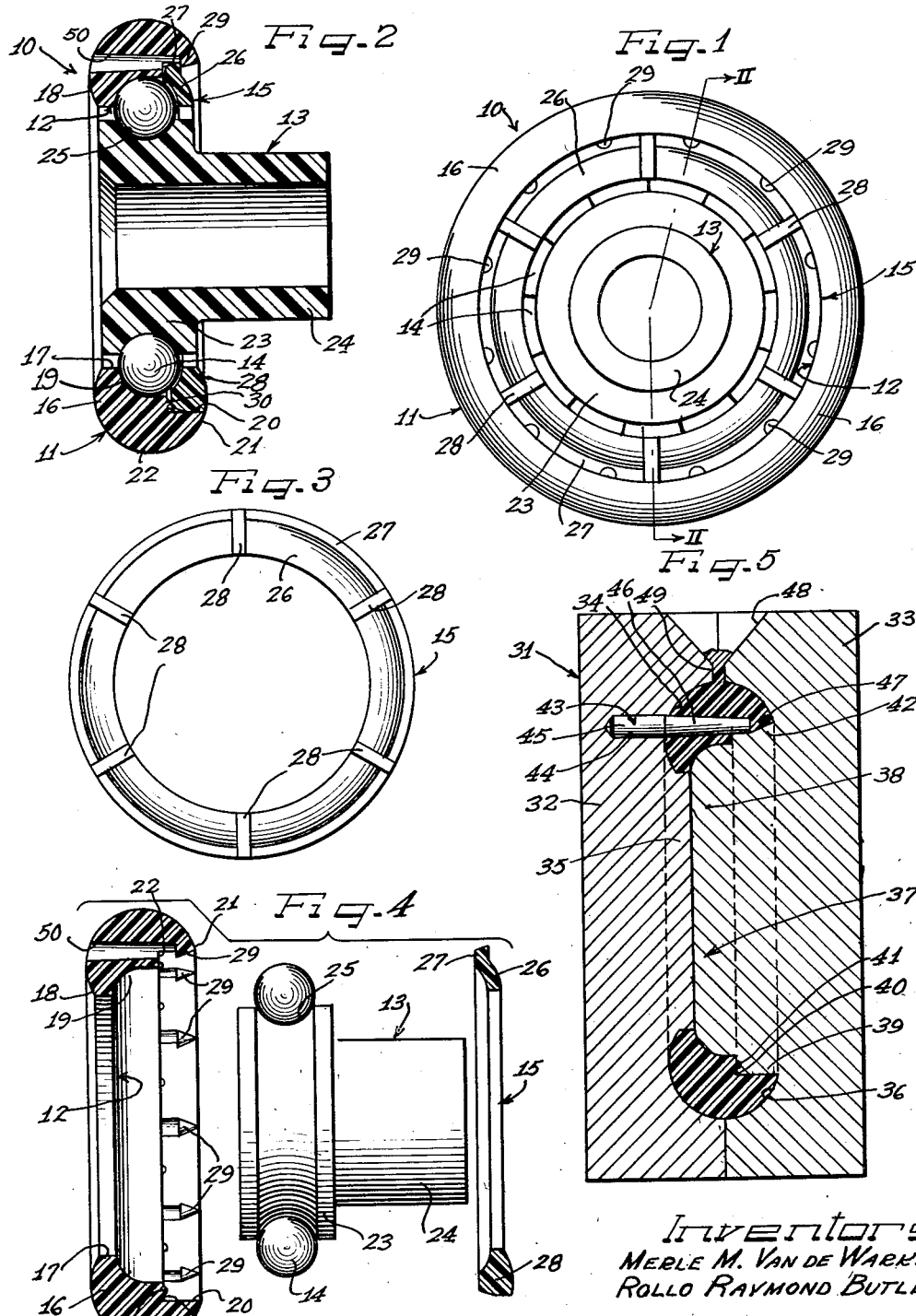

2,805,107

NYLON ROLLER ASSEMBLY

Merle M. Van De Warker, Eau Claire, and Rollo Raymond Butler, Detroit, Mich., assignors to Crawford Door Company, Detroit, Mich., a corporation of Michigan Application June 21, 1955, Serial No. 516,818

8 Claims. (Cl. 308—190)

The present invention relates to a new roller structure and more particularly relates to a nylon door roller for upward acting garage doors and the like, and includes a method of making such rollers.

In accordance with this invention a tire or outer housing ring is molded in one piece from plastic material preferably of the self-lubricating waxy type such as polymeric amides (nylon), polyethelene and the like. The tire ring has an internal partial ball race and a locking ring recess with locking abutment tabs. A hub member preferably of the same plastic material as the tire, has a ball race therearound fitting freely in the tire together with a projecting axle-receiving hollow shaft portion. A locking ring also of the same plastic material, is received in the recess of the tire and is snapped behind the tabs to be held in position. The locking ring has a partial ball race coacting with the ball race of the tire to provide an outer race ring.

An important feature of this invention is the one piece tire member with the locking ring retaining tabs to accommodate a one-piece locking ring whereby the entire assembly only has three component parts in addition to the anti-friction elements.

It is then an object of this invention to provide a roller structure from three component parts that are held together without the aid of additional fasteners.

A still further object of this invention is to provide a door roller or the like, preferably formed from self-lubricating plastic material, wherein a tire portion retains a locking ring and coacts with the locking ring to form an outer ball race and a dust seal for a ring of balls.

A still further object of this invention is to provide an improved tire for a door roller or the like which will accommodate in locked relation therein a locking ring that cooperates therewith to form an outer raceway.

A still further object of this invention is to provide a door roller composed of three nylon parts and a plurality of metal ball bearings.

Another object of this invention is to provide an anti-friction roller with a hub defining an inner raceway and a one piece tire surrounding the hub in close running clearance relation and defining a portion of an outer raceway together with a locking ring snapped in the tire to complete the outer raceway and seal the anti-friction chamber between the hub and tire.

In the drawings:

Figure 1 is an end elevational view of a roller assembly of the instant invention;

Figure 2 is a cross-sectional view taken substantially along the section line II—II of Figure 1 with parts in section and parts in elevation;

Figure 3 is an elevational view of the retaining or locking ring for the roller;

Figure 4 is an exploded partial sectional view showing the component parts of the roller assembly and illustrating the manner in which the same are associated to form the finished structure; and Figure 5 is a cross-sectional view taken through a die mold assembly illustrating the preferred manner for producing the tire for the roller member of the instant assembly.

As shown in the drawings:

The roller assembly 10, is of the axle-receiving upward acting door support type and includes, a plastic tire or outer roller housing 11, with a stepped bore 12 therethrough. A plastic hub 13 fits freely in the bore 12 to provide an inner ball race for a plurality of circumferentially spaced anti-friction elements 14. A plastic locking or retaining ring 15 is fitted in one side of the tire and functions to prevent axial disengagement of the anti-friction elements 14 from the assembly 10 and to limit axial movement of the hub 13 in the cylindrical bore 12. In addition to its retaining function the retaining ring 15 is diametrically so dimensioned as to provide a dust seal for the roller assembly 10.

The member 11 comprises an annular tire-like body 16 having a rounded generally outer periphery to ride in a metal track, such as is commonly employed in overhead garage door installations.

The cylindrical bore 12 formed through the member 11 comprises a reduced diameter or small cylindrical end portion 17 extending axially inward from the outer face 18 of the member a curved ball race portion 19 extending radially outward and axially inward and a large cylindrical end portion 20 extending axially inward from the inner face 21 of the member having a diameter greater than the largest diameter of the ball race portion 19, and joined therewith by a radially shoulder 22.

Nylon is especially suited for producing roller members for use in overhead garage or the like sliding doors, for this material has self lubricating properties; is chemically inert to the elements; is light weight and reduces the inertia of the roller assembly; and, because of its resilient or elastomeric nature is capable of absorbing vibrations during movement in a metal track thereby to decrease significantly the noise created by a plurality of such roller elements, as opposed to the use of steel or the like metal roller members.

The cylindrical hub 13 includes a cylindrical enlarged portion 23 integral with one marginal end portion of the hub, and an integral, reduced diameter shaft portion 24 projecting axially from the enlarged portion 23.

The enlarged portion 23 is dimensioned diametrically so as to fit closely but freely within the outer portion 17 of the cylindrical bore 12 in spaced concentric relation thereto. This allows the anti-friction elements 14 disposed between the hub 13 and the tire 11 to be substantially covered at the outer face of the assembly. The gap between the tire and hub need only be wide enough to insure free rotation between the tire and hub. A dirt seal is thereby obtained.

The shaft portion 24 of the hub 13 projects axially outwardly from the inner face 21 of the roller member 11 when the hub is positioned in the roller member in assembled association. The axially projecting shaft portion 24 prevents tilting of the hub on a shaft and also provides a spacer to hold the tire away from the side of a door or the like.

The hub is grooved to form an annular ball race 25 which is in open confronting relationship to the curved intermediate portion 19 of the cylindrical bore 12 in the roller member when the hub 13 is properly positioned therein. When thus properly positioned the ball race 25 provides an inner race way, while the curved intermediate portion 19 of the cylindrical bore 12 provides the outer half of an outer race way.

The hub 13 is preferably produced from the same plastic or a similar material as employed in forming the roller member 11. Although in the preferred embodiment shown in the drawings the hub 13 is described as being formed of preferably an elastomeric material such as nylon, it will be apparent that a metal hub could also be suitable. Nylon, however, is usually more suitable than metal for substantially the same reasons as set forth above in describing the desirability of employing nylon or the like in producing the roller member 11. Likewise, it will be appreciated and apparent that the hub 13 could be solid as opposed to being hollow as shown in the drawings. The hollow hub 13 as illustrated is preferred, however, for economic expedience and to decrease the overall weight of the roller assembly 10. It will be apparent, from a consideration of the function of the roller assembly 10 that the anti-friction ball elements 14 could assume a different form, such as for example roller bearings or the like, and would not necessarily be restricted to the use of the ball bearings 14 as illustrated.

The retaining or locking ring 15 is also preferably formed of plastic and includes an annular axially curved body portion 26 having an integral annular radially outwardly projecting flange portion 27 formed on the circumferential marginal portion of the body 26. A plurality of circumferentially spaced radially extending ribs 28 are provided integral with the annular body portion 26 and the annular flange 27 for increasing the rigidity and strength of the retaining ring 15. The curved portion 26 forms a ball race coacting with the tire portion 19 and form an outer raceway for the ball 14.

The ring 15 snugly fits in the bore 20 and will also function to provide a dust seal for the unit to minimize ingress of foreign material between the hub 13 and the tire 11.

The retainer ring 15 is preferably formed from the same or similar material employed in producing the roller member 11. That is, the retainer ring 15 comprises preferably a solid annular resilient or elastomeric nylon or the like ring which is capable of being resiliently deformed and snapped into tight retaining association with the tire 11.

To lock the ring in the bore 20 a plurality of circumferentially spaced and aligned abutment projections or tabs 29 are formed integrally on the bore 20 of adjacent the inner face 21 of the roller member. These abutment projections or supporting tabs 29 have sloping outer faces leading inwardly to the inner ends of radial abutment faces which project radially inwardly from the wall of the cylindrical bore 20 a short distance toward the axis of the bore. The diametric distance between the radially inner surface of each of the tabs 29 and a tab located diametrically oppositely on the inner surface of the roller member 11 is preferably slightly smaller than the outer diameter of the retaining ring 15. This allows the retaining ring to be pressed into the tire and forced over the sloping faces of the tabs to be flexed resiliently inward and then snapped radially outwardly to assume an unstressed position with the axial outer face of the annular flange 27 bottomed on or in abutting supporting contact with each of the tabs 29. When the retaining ring 15 is thus positioned the supporting tabs 29 function as a circumferentially interrupted bottoming shoulder and effectively prevent axial outward movement of the retainer ring through abutting contact with the outer peripheral margin of the ring in the region of the annular flange 27.

Means are provided on the tire member 11 for resiliently biasing the retaining ring axially outwardly in opposition to the abutment resistance of the support tabs 29 for resiliently holding the retaining ring in a ball bearing and hub restraining disposition. As seen best in Figures 2, 4 and 5, such means include resilient button-like projections 30 which extend axially outwardly from the shoulder 22 toward the inner face portion 21 of the roller member. These button-like projections 30 are adapted to be deformed resiliently axially inwardly by the retaining ring 15 when the same is positioned between or interjacent the tabs 29 in the shoulder 22. The resilient or elastomeric nature of the material from which the roller member 11 is formed produces an axially outward biasing pressure against the inner radial face of the retainer ring 15 in opposition to compression by the retainer ring which acts to force the retainer ring 15 axially outwardly in opposition to the abutment or supporting tabs 29. This axially opposite coaction between the resilient button-like projections and the supporting tabs 29 act to hold or resiliently restraining by lock the retaining ring 15 in the proper desired ball bearing end hub restraining disposition in the roller assembly 10, and for providing a dust seal for minimizing the ease with which dust or the like contaminant or foreign material may find its way into the assembly.

By means of the instant invention it is now possible to produce a one-piece annular roller tire member having a radially inwardly projecting abutment shoulder portion in the form of a plurality of the circumferentially spaced and aligned support tabs 29 without the use of removable cores during the molding operation. The means and method by which this is achieved is shown more or less schematically in Figure 5. As seen therein a molding apparatus, shown generally at 31 is provided to facilitate the thermoplastic injection or the like molding of an annular roller member such as 11. The mold apparatus 31 includes, as its component parts, a pair of mated die bodies comprising a first die body 32 adapted for mated face-to-face interengagement with a second die body 33.

The first die body 32 is provided with a generally centrally disposed annular recess portion in the inner face thereof, as at 34 which conforms to the configuration of the curved outer half portion of the roller body 16. The non-recessed central portion of the inner face of the first die body 32 defined within the confines of the recess 34 provides a short cylindrical shaft or center post 35 which acts to form the outer portion 17 of the cylindrical bore 12 in the roller member during the molding operation.

The second die body 33 includes a generally centrally disposed annular recess formed on the inner face thereof, as at 36 which conforms to the outer curved configuration of the inner half portion of the roller body 16. The non-recessed central portion of the inner face of the second die body 33 is formed to project laterally therefrom to provide a center post or shaft 37, which is adapted for flush face-to-face engagement with the surface of the short center post 35 on the first die body 32 when the respective die bodies are in mated face-to-face relation with the annular recesses 34 and 36 in circumferentially aligned disposition preparatory to the introduction of a thermoplastic elastomeric material into the mold.

The laterally outwardly projecting center post 37 of the second die body 33 has the outer circumferential marginal portion thereof curved arcuately outwardly and inwardly toward the die body, as at 38, and functions to form the curved intermediate portion 19 of the wall of the cylindrical bore 12 in the roller member during the molding operation thereof. The center post 37 also includes an inner portion 39 having a diameter greater than that of the outer portion 38. This disparity in the diameters between the outer portion 38 and the inner portion 39 provides a shoulder 40 which conforms in configuration to the functions to form the shoulder 22 on the roller member 11 during the molding operation.

A plurality of hemispherical recessed portions are provided in circumferentially spaced disposition on the shoulder 40 to form button-like recesses 41 for forming the axially outwardly extending button-like resilient biasing projections 30 on the roller member 11.

A plurality of circumferentially spaced generally tapered cut-out portions 42 are provided contiguous with the outer peripheral margin of the inner portion 40 of the center post 37 for a purpose to be explained more fully hereinafter.

A plurality of circumferentially spaced and aligned pins 43 are mounted in the first die body portion 31 in suitably formed pin-receiving bores 44. Each pin 43 includes a generally cylindrical inner portion 45 which is adapted to be removably disposed in snug fitting relation in the bore 44, and a laterally outwardly projecting generally tapered integral shank portion 46. Each of the pins is circumferentially spaced so as to be axially aligned with a cut-off recess portion 42 on the second die body member 33 when the first and second die bodies are in mated face-to-face disposition. The length of the pin 43 and the depth of the bore 44 in which it is received are so dimensioned with regards to one another that the end surface of the shank portion 46 of the pin extends laterally beyond the inner face of the first die body 31 to a position in which the marginal end portion of the shank 46 contacts the tapered surface of the tapered recess cut-out portion 42 on the second die body 33 with which the pin is aligned when the respective die bodies are in mated face-to-face disposition.

This contacting relationship existing between the marginal end portion of the shank portion 46 of the pin 43 with the tapered surface of the tapered recess cut-out portion 42 when the die bodies are in a close mated position provides a more or less hook-like molding recess 47 having a more or less flat or plane radial innerface generally parallel to the inner and outer surfaces of the annular recesses 34 and 36 in the first and second die bodies, respectively. This hook-shaped recess provides the molding structure which produces the plurality of circumferentially aligned and spaced supporting tabs 29 on the roller member 11 which support the retaining ring 15.

In producing the roller element of the instant invention, the first and second die body portions 31 and 33, respectively, are positioned together in mated face-to-face relation such as by means of suitable pilot pins (not shown) with each of the circumferentially spaced pins 43 in the first die body 31 in mated aligned relationship with a tapered recess cut-out portions 42 on the second die body 33, as seen in Figure 5. As also seen therein, when the die bodies are in closed mated disposition the short center post 35 on the first die body and the laterally outwardly projecting center post 37 on the second die body are in flushed face-to-face contact.

The first and second die bodies when thus properly positioned in closed mated contact are then clamped together by suitable means and the resilient or elastomeric material which is to be used in forming the roller element 11 is then introduced into the die cavity defined by the recesses 34 and 36 via a sprue 48 provided in the top portion of the mold apparatus 31 which registers with the die cavity by means of a gate 49. When a long chained polyamide such as nylon is employed in producing the roller element 11 this introduction of the material into the die cavity may be efficiently effected by means of a thermoplastic injection molding techniques employing suitable elevated temperatures and pressures.

After the die cavity has been filled with the proper amount of the thermoplastic elastomeric material, the die or mold apparatus 31 is allowed to cool to solidify the elastomeric material contained therein. Thereafter the first and second die bodies 31 and 33, respectively, are separated and the roller tire member 11 removed therefrom. Removal of the pins 43 from the roller member 11 molded therearound forms an inwardly extending tapered bore 50. The presence of a plurality of these circumferentially spaced tapered bores 50 in the finished roller member 11, however, does not to any extent weaken the structural rigidity of the roller body 16. Indeed, the presence of a plurality of the bores 50 has, rather, been found to be more or less desirable in that it reduces the total weight of the roller assembly and also reduces the amount of elastomeric material required to produce the roller member 11 which, obviously, is of an economic advantage.

It will be apparent to those skilled in the art that the instant invention now provides a new and improved roller assembly for supporting and guiding movement of garage or the like sliding doors and in which a novel one-piece roller member is provided by means of improved die mold structure and apparatus.

It will also be apparent that the provision of the novel one-piece roller member in which a plurality of circumferentially spaced and aligned radially inwardly projecting shoulder means in the form of the supporting tabs 29 produces a roller assembly which, in cooperation with the retaining ring 15, has not been contemplated heretofore.

It will be understood that modifications and variations may be effected without departing from the scope of the novel concepts of the present invention.

We claim as our invention:

1. A roller construction comprising a one-piece molded plastic tire having a stepped bore therethrough defining a cylindrical recess in one face thereof, a portion of a race ring adjacent the recess and a reduced diameter opposite face portion, said recess being bottomed by a radial shoulder and having circumferentially spaced retainer lugs projecting therefrom to form radial abutment faces in spaced relation from the shoulder, said lugs having sloping outer walls converging from the outer face of the tire to the radial inner ends of the abutment faces, said tire having axial holes extending from the faces of said lugs through the opposite face of the tire, a molded plastic hub having a race ring therearound, said hub fitting in said tire and having a portion in close running clearance relation with the small end of the bore, a molded plastic locking ring in said recess of the tire between the shoulder and the abutment faces of said lugs, said locking ring having a curved portion cooperating with the race ring portion of the tire to define an outer raceway, said locking ring having an inner periphery surrounding said hub in close running clearance relation, and a ring of metal ball bearings between the hub and tire and riding on the raceway of the hub and the raceway provided by the tire and locking ring, said locking ring being resiliently deformable by the sloping outer walls of the lugs when pressed into the recess whereupon the ring can be snapped into position to be retained by the abutment faces of the lugs.

2. A roller construction which comprises a molded plastic tire having a stepped bore therethrough with a large diameter recess extending inwardly from one face to a radial shoulder and a small diameter portion extending inwardly from the opposite face, said bore having a curved ball race portion between the small diameter portion and the shoulder, a hub member having an outer race portion confronting the ball race of the tire, a retaining ring in said recess of the tire bottomed on said shoulder, lugs on the tire providing abutment faces overlying the outer margin of the retaining ring to hold the ring on said shoulder, said lugs having sloping outer faces converging to the abutment faces for guiding the retaining ring into the tire, said ring having a curved recess confronting the ball race portion of the tire to coact therewith in defining an outer ball raceway, a ring of ball bearings between the tire and hub riding on the raceways provided thereby, and the inner periphery of said retainer rings and said small diameter end portion of the bore being in close running clearance relation with the hub to effectively close the chamber receiving the ball bearings.

3. A roller adapted for upward acting doors and the like which comprises a molded self-lubricating waxy polymeric resin assembly including a tire, a hub, and a locking ring with metal ball bearings between the hub and tire, said locking ring being pressed into one face of the tire and coacting with the tire to form an outer ball race, and said tire having a ring of locking ring retaining lugs with abutment faces projecting inwardly adjacent one end of the tire and abutting the outer face of the ring, and said lugs having outer faces converging inwardly from said end of the tire to wedge guide the locking ring to the abutment faces.

4. A roller adapted for upward acting doors and the like comprising a nylon tire member, a nylon hub member, a nylon locking ring, and a ring of metal ball bearings between the hub and tire, said tire having a locking ring receiving recess in one face thereof, lugs projecting into said recess for overlying the outer margin of the locking ring to secure the ring on the recess, said tire and locking ring coacting to form an outer ball bearing raceway, said hub having a groove therearound forming an inner ball bearing raceway, and said raceways being sufficiently deep to substantially completely surround the ball bearings whereby only small gaps will be provided between the hub and tire and between the hub and locking ring to substantially seal the chamber receiving the ball bearings.

5. A bearing assembly which comprises an inner ring with a raceway therearound, an outer ring with a partial raceway around the inner periphery thereof, a locking ring secured in the outer ring and having a portion coacting with the inner periphery of the outer ring to form a complete outer raceway therewith, and anti-friction elements riding on said raceways to hold the inner and outer rings against relative axial movements while accommodating free relative rotation, said outer ring having radially deformable means overlying the peripheral margin of the locking ring to retain the locking ring in the outer ring, and said deformable means having sloping wedge guide faces to direct the locking ring into position in the outer ring.

6. In a roller assembly, an annular roller member having means defining a cylindrical bore therethrough, a generally cylindrical hub including an enlarged portion on a marginal end portion thereof positioned within said cylindrical bore and extending axially therethrough, means defining an annular ball race on the outer peripheral surface of said enlarged portion, a plurality of circumferentially spaced ball bearings carried by said annular ball race for disposition between said hub and the wall of said cylindrical bore, a solid annular elastomeric retaining ring disposed about said hub circumjacent the enlarged portion thereof for preventing axial disengagement of said ball bearings and for limiting axial movement of said hub, said retaining ring being diametrically so dimensioned as to provide a seal against the ingress of dust into the roller assembly, a plurality of circumferentially spaced and aligned supporting tabs formed integrally with said roller member on its inner peripheral surface adjacent a side thereof and projecting radially into said cylindrical bore toward the axis thereof, said supporting tabs being adapted to engage the outer peripheral margin of said retaining ring and hold the same against outward axial movement, and a plurality of circumferentially spaced projections formed integrally with and extending axially outwardly from said roller member on the same side as that with which said supporting tabs are associated, said projections being adapted to be deformed resiliently axially inwardly by said retaining ring and to exert a biasing action axially outwardly thereagainst in opposition to said supporting tabs for resiliently holding said retaining ring firmly in a ball bearing and hub restraining disposition.

7. In a roller assembly including a one-piece elastomeric roller member having means defining a cylindrical bore therethrough for receiving a hub therein, a plurality of anti-friction elements disposed interjacent the hub and the wall of the bore, and having a resilient retaining ring disposed about said hub for limiting axial movement thereof and preventing disengagement of said anti-friction elements, the improvement which comprises: providing a plurality of circumferentially spaced and aligned supporting tabs formed integrally with said roller member on its inner peripheral surface adjacent a side thereof and projecting radially into said cylindrical bore toward the axis thereof, said supporting tabs being adapted to engage the outer peripheral margin of said retaining ring and hold the same against outward axial movement, and a plurality of circumferentially spaced projections formed integrally with and extending axially outwardly from said roller member on the same side as that which said supporting tabs are associated, said projections being adapted to be deformed resiliently axially inwardly by said retaining ring and to exert a biasing action axially outwardly thereagainst in opposition to said supporting tabs for resiliently holding said retaining ring firmly in a ball bearing and hub restraining disposition.

8. A ball bearing assembly which comprises an outer ring having a cylindrical recess extending axially inward from a first face thereof and a small diameter cylindrical bore extending axially inward from a second face thereof, a partial ball race between the bore and the recess, said ball race extending radially outward and axially inward from the small diameter bore, a radial shoulder between the recess and the axial inner end of the ball race, said outer ring having a plurality of circumferentially spaced holes extending from said second face thereof to said recess, a lug projecting inwardly from said recess at the inner end of each hole, each lug having a substantially radially extending abutment face and an inclined outer face diverging to the axial outer end of the recess, said abutment faces being spaced a substantially equal distance from said shoulder, a plurality of deformable buttons on said shoulder projecting toward said abutment faces, a locking ring having a radial marginal lip pressed against said buttons and backed by said abutment faces to be held thereby in firm engagement with the buttons, said locking ring having a curved ball race defining portion projecting into said recess and confronting the ball race portion of the outer ring to cooperate therewith in defining an outer raceway, integral reinforcing ribs on said locking ring extending radially across the outer face thereof, a hub projecting into the locking ring and outer ring in close running clearance relation therewith, said hub having an inner raceway therearound, and ball bearings riding in said inner and outer raceways to hold the rings against axial displacement while accommodating free relative rotation.

References Cited in the file of this patent

UNITED STATES PATENTS

| 1,963,592 | Pribil | June 19, 1934 |
| 1,975,296 | Ross | Oct. 2, 1934 |
| 2,112,754 | Annen | Mar. 29, 1938 |
| 2,449,943 | Johnson | Sept. 21, 1948 |
| 2,586,087 | Reynolds et al. | Feb. 19, 1952 |
| 2,614,898 | Adams | Oct. 21, 1952 |

FOREIGN PATENTS

| 1,092,766 | France | Nov. 10, 1954 |

OTHER REFERENCES

Product Engineering, 1953 Annual Handbook, pages C30–C32.